United States Patent
Kearl et al.

(10) Patent No.: US 8,039,158 B2
(45) Date of Patent: Oct. 18, 2011

(54) METHODS OF OPERATING AND MAKING A SOLID OXIDE FUEL CELL SYSTEM

(75) Inventors: Daniel A. Kearl, Philomath, OR (US); Richard B. Peterson, Corvallis, OR (US)

(73) Assignee: Eveready Battery Company, Inc., St. Louis, MO (US)

( * ) Notice: Subject to any disclaimer, the term of this patent is extended or adjusted under 35 U.S.C. 154(b) by 2025 days.

(21) Appl. No.: 11/168,712

(22) Filed: Jun. 27, 2005

(65) Prior Publication Data
US 2005/0238946 A1 Oct. 27, 2005

Related U.S. Application Data

(62) Division of application No. 10/117,502, filed on Apr. 3, 2002, now Pat. No. 6,936,366.

(51) Int. Cl.
*H01M 8/04* (2006.01)
(52) U.S. Cl. ......... 429/443; 429/442; 429/495; 429/456
(58) Field of Classification Search .................. 429/13, 429/17, 19, 20, 26, 34, 38, 39, 30, 32
See application file for complete search history.

(56) References Cited

U.S. PATENT DOCUMENTS

| | | | |
|---|---|---|---|
| 3,992,226 A | 11/1976 | Godshalk | |
| 4,098,246 A | 7/1978 | Noguchi et al. | |
| 4,248,941 A * | 2/1981 | Louis et al. | 429/13 |
| 4,523,560 A | 6/1985 | Motosugi et al. | |
| 5,037,619 A | 8/1991 | Alagy et al. | |
| 5,486,428 A | 1/1996 | Gardner et al. | |
| 5,518,830 A | 5/1996 | Worrell et al. | |
| 5,741,605 A | 4/1998 | Gillett et al. | |
| 5,827,620 A | 10/1998 | Kendall | |
| 5,858,314 A | 1/1999 | Hsu et al. | |
| 6,110,614 A | 8/2000 | Fellows | |
| 2001/0036566 A1 | 11/2001 | Dekker et al. | |
| 2003/0003344 A1* | 1/2003 | Keegan | 429/38 |

FOREIGN PATENT DOCUMENTS

| | | |
|---|---|---|
| EP | 0271568 | 1/1992 |
| EP | 1035610 A2 | 9/2000 |
| GB | 1213130 | 11/1970 |

OTHER PUBLICATIONS

Janicke et al., "The Controlled Oxidation of Hydrogen from an Explosive Mixture of Gases Using a Microstructed Reator/Heat Exchanger and Pt/Al2O3 Catalyst" J. Catalysis 191, pp. 326-329 (2000).
Priestnall M.A. et al., "Compact mixed-reacting fuel cell" Journal of Power Sources Elsevier Sequoia S.A. Lausanne, CH vol. 106, No. 1-2, Apr. 1, 2002, pp. 21-30, XPO 04348665.
Kuo, Kenneth Kuan-Yun, "Principles of Combustion", John Wiley and Sons, Inc., 1986, pp. 326-329.

* cited by examiner

*Primary Examiner* — Raymond Alejandro
(74) *Attorney, Agent, or Firm* — Michael C. Pophal

(57) ABSTRACT

A solid oxide fuel cell system includes at least one fuel cell and at least one gas flow channel to deliver a reactant mixture. The fuel cell comprises at least one chamber to house at least one anode, at least one cathode, and at least one electrolyte, and the fuel cell is adapted to receive a reactant mixture comprising reactants mixed prior to delivery to the fuel cell. The one or more gas flow channels for delivering the reactant mixture have characteristic dimensions that are less than a quench distance of the reactant mixture at an operating temperature within the solid oxide fuel cell system.

13 Claims, 4 Drawing Sheets

METHODS OF OPERATING AND MAKING A SOLID OXIDE FUEL CELL SYSTEM

CROSS-REFERENCE TO RELATED APPLICATIONS

This application is a divisional of prior application Ser. No.10/117,502 filed Apr. 3, 2002, now U.S. Pat. No. 6,936,366, which is hereby incorporated by reference herein.

FIELD OF THE INVENTION

The present invention is directed to the field of fuel cells and more particularly to a single chamber solid oxide fuel cell.

BACKGROUND OF THE INVENTION

Solid oxide fuel cells (SOFCs) are designed to introduce reactant gases to two electrodes (i.e. an anode and a cathode) which are then brought into electrical contact via an electrolyte. Traditionally, the reactant gases are mixed within the fuel cell, with the oxidant, e.g. air, being first introduced at the cathodic portion of the fuel cell, and the fuel, e.g. hydrogen or hydrocarbon, being first introduced at the anodic portion. An external load is connected to the anode and cathode causing oxygen at the cathode to react with incoming electrons from the external circuit to form oxygen ions. The oxygen ions migrate to the anode through the electrolyte and oxidize the fuel at the anode, resulting in the liberation of electrons to the external circuit and causing a current flow that returns electrons to the cathode.

One development in SOFCs has been the use of a single chamber design to simplify the cell fabrication and subsequent system operation. The single chamber design requires the reactants to be mixed prior to delivery to the anode and cathode of the fuel cell. (See, for example, U.S. Pat. No. 4,248,941 to Louis et al.). Since SOFCs generally operate at or above 500° C., the potential for uncontrolled exothermic reactions is present in any single chamber design. Uncontrolled reactions can cause the consumption of the reactants before and during the delivery of the reactants to the operating cell resulting in reduced efficiency or potentially damaging explosions.

SUMMARY OF THE INVENTION

The present invention provides a solid oxide fuel cell system comprising at least one fuel cell and at least one gas flow channel to deliver a reactant mixture. The fuel cell comprises at least one chamber to house at least one anode, at least one cathode, and at least one electrolyte, and the fuel cell is adapted to receive a reactant mixture comprising reactants mixed prior to delivery to the fuel cell. The one or more gas flow channels for delivering the reactant mixture have characteristic dimensions that are less than a quench distance of the reactant mixture at an operating temperature within the solid oxide fuel cell system.

BRIEF DESCRIPTION OF THE DRAWINGS

The invention is described with reference to the several figures of the drawing, in which.

DETAILED DESCRIPTION OF THE INVENTION

Figure 1:
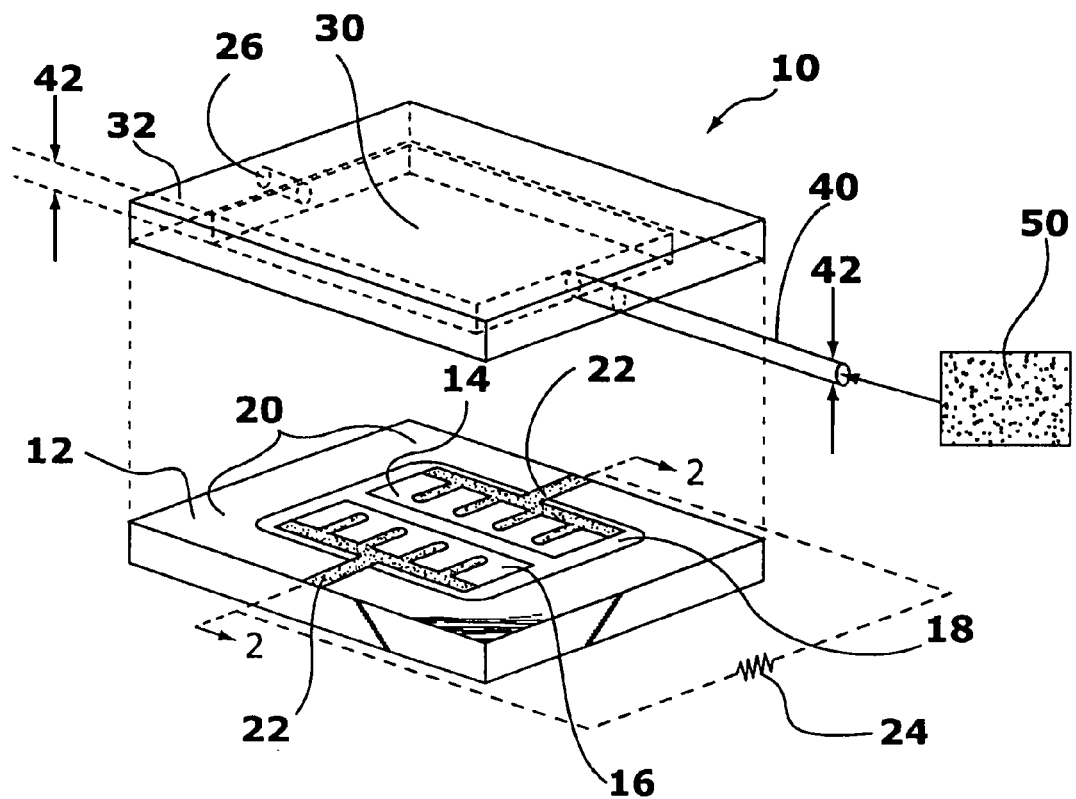
FIG. 1 shows a fuel cell system according to one embodiment of the invention.

The present invention utilizes a single chamber design in a solid oxide fuel cell to simplify the cell fabrication and subsequent system operation. The single chamber design requires the reactants, normally a gaseous fuel and air, to be mixed prior to delivery to the anode and cathode of the fuel cell. Note that in single chamber SOFCs, the anode and cathode may be either on the same side or opposite sides of the electrolyte. Having both on the same side facilitates the fabrication of the cell if photolithography and other techniques common to the electronics industry are used for construction. Regardless of the configuration of the cathode and anode, the reactants are mixed prior to delivery to the fuel cell.

Since SOFCs generally operate at or above 500° C. (and potentially as high as 1000° C.), the potential for uncontrolled reactions is present in any single chamber design. The present invention describes an apparatus and method for reducing the chances of uncontrolled exothermic reactions from consuming the reactants before and during the delivery of the reactants to the operating cell. This is accomplished by reducing the characteristic dimensions of all gas flow passages up to a fuel cell or fuel cell stack, as well as the duct work within the fuel cell stack itself, to a size less than the quench distance of the reactant mixture at the temperature found within the SOFC system. In general, the characteristic dimension is the smallest dimension that defines a flow channel. The characteristic dimension of a flow channel having a circular cross-section is the diameter, while for a non-circular flow channel, including a flow channel having an aspect ratio approaching that of parallel plates, the characteristic dimension is the height of the channel. Careful design of the flow channels must take place at all locations where fuel and air exist combined into one reactant mixture In combustion terms, the quench distance is the distance below which a flame will not propagate. For example, in the case of a tube having a diameter below the characteristic dimension (quench diameter), a flame is quenched by the tube wall and cannot flash back. Quench distance is determined in part by the fuel/oxidant mixture, the operational temperature, and the operational pressure. The quench distance is generally smaller for more reactive fuels, decreases as temperature increases, and increases as pressure decreases. For a more detailed analysis of quench distance calculation, see Kuo, Kenneth K., Principles of Combustion, John Wiley, New York, 1986, pp. 326-329.

Referring now to the figures of the drawing, the figures constitute a part of this specification and illustrate exemplary embodiments to the invention. It is to be understood that in some instances various aspects of the invention may be shown exaggerated or enlarged to facilitate an understanding of the invention.

FIG. 1 illustrates a fuel cell system 10 according to one embodiment of the invention. A fuel cell 20 comprises an anode 14 and cathode 16 electrically connected via an electrolyte 18 and positioned on a support structure 12. Reactants, fuel and oxidant, are mixed prior to delivery to the fuel cell 20. The reactant mixture 50 is delivered to the operating fuel cell 20 via at least one gas flow passage 40. The gas flow passage 40 has a characteristic dimension (shown as the inside diameter 42) that is less than the quench distance of the reactant mixture at the temperature found within the SOFC system.

Because the diameter 42 of the gas flow passage 40 is less than the quench diameter, a flame cannot propagate along the gas flow passage, and the chance of uncontrolled reactions or explosions is reduced or even eliminated. The fuel cell is housed in a single chamber 30 providing a open space above the fuel cell that allows the reactant mixture 50 to contact the fuel cell. As shown, the chamber is formed as part of a delivery structure 32 which is attached in a leak-tight manner to support structure 12. The chamber 30 should also have characteristic dimensions that are less than the quench distance of the reactant mixture at the temperature found within the SOFC system. As shown, the chamber 30 has a characteristic dimension height 42 that corresponds with the diameter dimension 42 of the gas flow passage 40 and which is less than the quench distance of the reactant mixture.

Contacts 22 comprising an electrically conductive material are attached to the anode and cathode in finger like formations and provide contact points at the edge of the support structure 12. A completed circuit is created by connecting an eternal load 24. Spent reactant mixture and other byproducts such as water vapor can be expelled out of exhaust port 26.

For hydrocarbon/air mixtures at temperatures typical of SOFC operation (in the range of approximately 350° C. to 750° C.), the largest characteristic dimension of any flow path carrying the mixed reactants should not exceed 1 mm, and preferably should be less than 500 micrometers. For hydrogen/air mixtures, the largest characteristic dimension of any flow path carrying the mixed reactants should not exceed 0.5 mm, and preferably should be less than 100 micrometers. Note that large excess air flow rates will help to reduce the likelihood of reactions. There exists a lower flammability limit, at room temperature, under which the air/fuel mixture will not react. However, as the reactant mixture temperature increases, the benefits of excess air flow rates is diminished. Hence, a combination of both small passages and excess air flow rates is desirable in the design of the single chamber SOFC systems.

Figure 2:
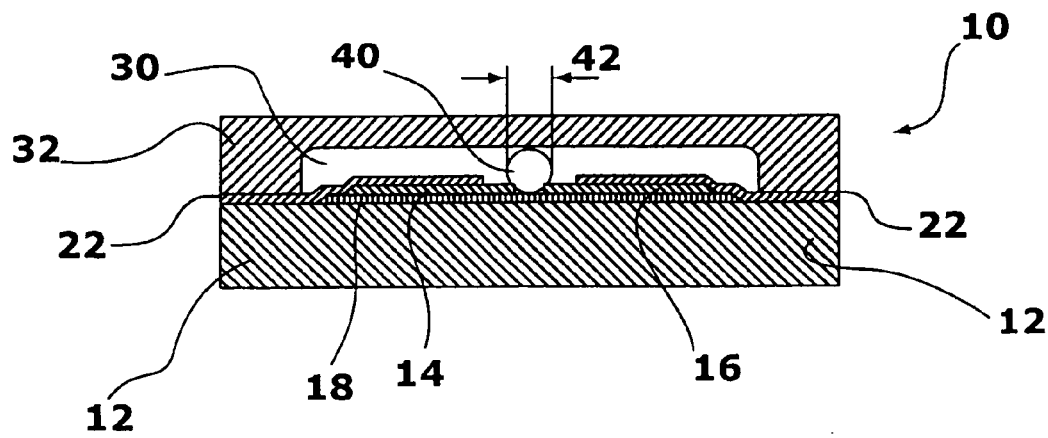
FIG. 2 is a cross-sectional view of the fuel cell system according to one embodiment of the invention.

FIG. 2 shows a cross-sectional view of the fuel cell system according to one embodiment of the invention. The point of view is shown in FIG. 1. The fuel cell 20 comprised of the anode, cathode and electrolyte is housed in a single chamber 30. Reactant mixture is supplied through a gas flow passage 40 having a characteristic dimension 42 less than the quench distance of the reactant mixture at the operating temperature of the SOFC system. The single chamber 30 also has a characteristic dimension less than this quench distance.

Figure 3:
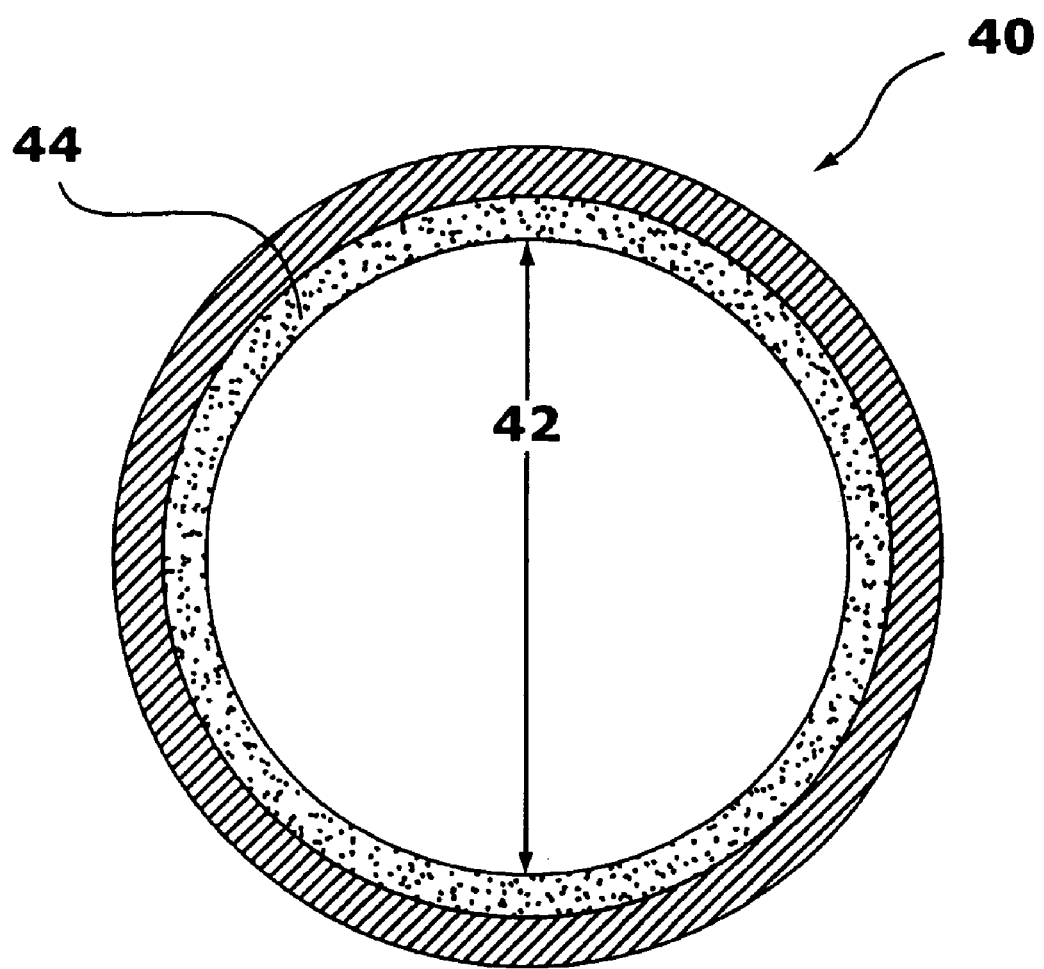
FIG. 3 is a cross-sectional view of a gas flow passage with a low catalytic activity surface according to one embodiment of the invention.

The present invention further discloses the use of low catalytic activity surfaces for all delivery channels in contact with the elevated temperature mixed reactants. Oxidized stainless steel, quartz, and alumina are examples of low catalytic activity materials known in the combustion literature not to be active at promoting reactions. The use of low catalytic activity surfaces on the gas flow channels exposed to the reactant mixture help limit uncontrolled reactions. FIG. 3 illustrates the use of a low catalytic activity surface 44 as applied to a gas flow passage 40. The quench diameter of the passage shown is measured from the inside of the passage (including the low catalytic activity surface); however, the width of the surface has been greatly exaggerated for purposes of clarity and in reality would be very small compared to the overall size of the passage. Low catalytic activity surfaces may be applied to all gas flow channels that are exposed to the reactant mixture including gas flow passages and ducts.

Figure 4:
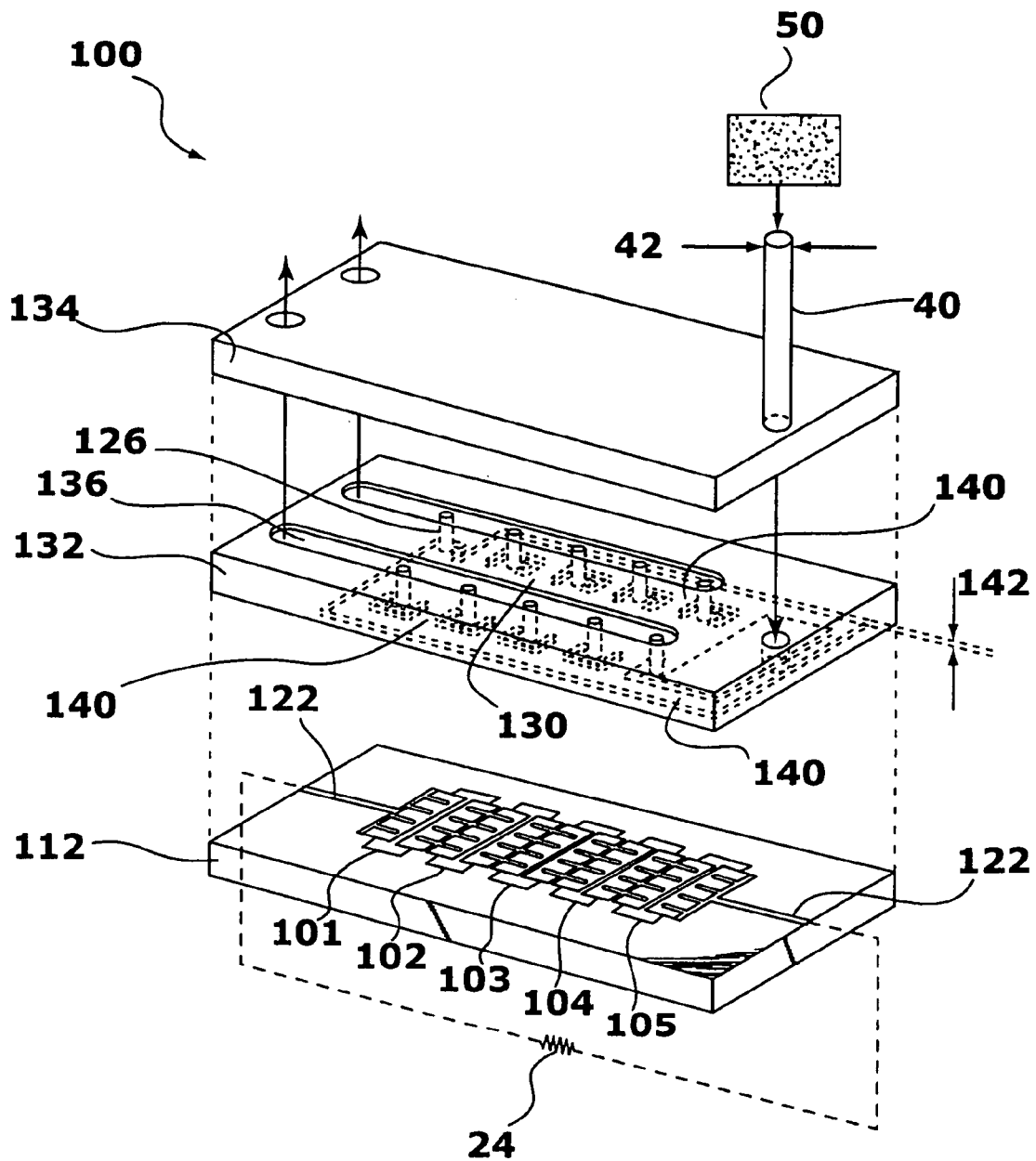
FIG. 4 shows a fuel cell stack according to one embodiment of the invention.

FIG. 4 illustrates a fuel cell stack 100 according to one embodiment of the invention. The fuel cell stack 100 comprises fuel cells 101-105 electrically connected in series on support structure 112, a delivery structure 132 defining delivery means and one or more chambers 130 to house fuel cells, and a top structure 134 to help prevent leaks in the fuel cell stack, all of which are attached together to form the fuel cell stack architecture. Gas flow passages 40 deliver the reactant mixture 50 to the fuel cell stack. Gas flow ducts 140 machined into the bottom of the delivery structure 132 then deliver the reactant mixture 50 within the fuel cell stack to the one or more chambers 130 and place the reactant mixture in contact with the fuel cells. For the aspect ratios of the chambers and ducts shown, the characteristic dimension defining the flow path is the height. Like the gas flow passages 40, the gas flow ducts 140 have characteristic dimensions (shown as height 142) that are less than the quench distance of the reactant mixture at the temperature found within the SOFC system. The one or more chambers 130 housing the fuel cells should also have characteristic dimensions less than this quench distance.

An exhaust mechanism, including exhaust ports 126 and exhaust channel 136, removes spent reactant mixture and byproducts such as water vapor. Fuel cell stacks may be further connected in parallel or series via contacts 122 to produce any desired power output for an external load 24.

For hydrocarbon/air mixtures, the largest characteristic dimension 142 of any flow path in the gas flow ducts 140 carrying the mixed reactants should not exceed 1 mm, and preferably should be less than 500 micrometers at temperatures characteristic of SOFC operation (in the approximate range of 350° C. to 750° C.). For hydrogen/air mixtures, the largest characteristic dimension 142 of any flow path in the gas flow ducts 140 carrying the mixed reactants should not exceed 0.5 mm, and preferably should be less than 100 micrometers.

In another embodiment, gas flow channels and housing chambers could potentially be designed so that both height and width of the non-circular channels and chambers have dimensions less than a quench distance of the reactant mixture at an operating temperature within the SOFC system. This is most applicable where the height and width of non-circular channels and chambers are approximately equal.

Figure 5:
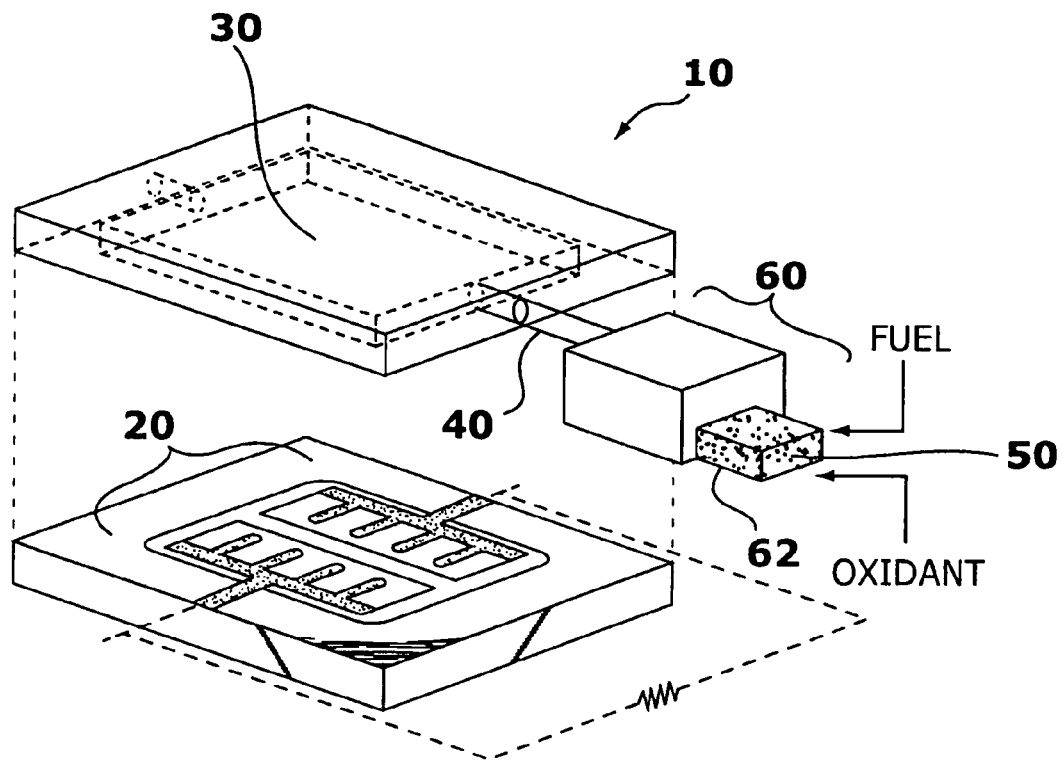
FIG. 5 shows a fuel cell system having a heat exchanger at the inlet according to one embodiment of the invention.

FIG. 5 shows a fuel cell system 10 having an heat exchanger 60 incorporated into the system. Fuel and oxidant can be mixed at the inlet 62 of the heat exchanger to produce the reactant mixture. Careful design of the flow channels must take place at all locations where fuel and air exist combined into one reactant mixture, including the reactant mixture transportation means within the heat exchanger. The incorporation of a heat exchanger into the fuel cell system is equally applicable to a fuel cell stack.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of operating a solid oxide fuel cell system, comprising:
   delivering a reactant mixture to at least one fuel cell through at least one gas flow channel, wherein said at least one gas flow channel has a characteristic dimension less than a quench distance of said reactant mixture at an operating temperature of the fuel cell.

2. The method of claim 1 further comprising the step of:
   forming said reactant mixture by mixing reactants prior to delivery to said at least one fuel cell.

3. The method of claim 1 further comprising the step of:
delivering said reactant mixture through at least one gas flow duct within a fuel cell stack formed by at least two fuel cells, wherein said at least one gas flow duct has a characteristic dimension less than the quench distance of said reactant mixture at the operating temperature of the fuel cell.

4. The method of claim 1 further comprising the step of:
delivering said reactant mixture to a heat exchanger prior to delivery of the reactant mixture to said at least one fuel cell.

5. The method of claim 1 further comprising the step of applying at least one low catalytic activity layer on a surface of said at least one gas flow channel where exposed to said reactant mixture.

6. The method of claim 1, further comprising using a hydrocarbon/oxidant reactant mixture, wherein said characteristic dimensions do not exceed 1 mm.

7. The method of claim 6, wherein said characteristic dimensions are less than 500 micrometers.

8. The method of claim 1, further comprising using a hydrogen/oxidant reactant mixture, wherein said characteristic dimensions do not exceed 0.5 mm.

9. The method of claim 8, wherein said characteristic dimensions are less than 100 micrometers.

10. The method of claim 1, wherein said reactant mixture is delivered to a chamber containing an anode, a cathode and an electrolyte of a said fuel cell, wherein said chamber has a characteristic dimension less than a quench distance of said reactant mixture at an operating temperature of the fuel cell.

11. A method of making a solid oxide fuel cell system, comprising:
manufacturing all gas flow channels and chambers exposed to a reactant mixture within the solid oxide fuel call system to have characteristic dimensions less than a quench distance of said reactant mixture at a temperature found within the solid oxide fuel cell system.

12. The method of claim 11 wherein said gas flow channels and chambers comprise:
at least one gas flow passage, at least one gas flow duct, and at least one housing chamber.

13. The method of claim 11, further comprising changing said characteristic dimensions depending on whether said fuel cell system will utilize a hydrocarbon or hydrogen mixed with an oxidant as said reactant mixture.

\* \* \* \* \*